United States Patent [19]

Romeas

[11] 4,357,626
[45] Nov. 2, 1982

[54] SYSTEM FOR BROADCASTING AUDIO-VISUAL TELEVISION SIGNALS SYNCHRONIZED BY A PILOT FREQUENCY AND METHOD FOR THE APPLICATION OF SAID SYSTEM

[75] Inventor: René Romeas, Paris, France

[73] Assignee: Thomson-Brandt, Paris, France

[21] Appl. No.: 88,354

[22] Filed: Oct. 26, 1979

[30] Foreign Application Priority Data

Oct. 31, 1978 [FR] France ................................ 78 30851

[51] Int. Cl.³ .............................................. H04N 5/76
[52] U.S. Cl. .................................. 358/335; 360/37.1; 358/141; 358/319
[58] Field of Search .................. 358/127, 128.5, 128.6, 358/130, 148, 141; 360/37, 34, 77

[56] References Cited

U.S. PATENT DOCUMENTS

| | | | |
|---|---|---|---|
| 2,477,679 | 8/1949 | Young, Jr. | 358/145 |
| 2,580,672 | 1/1952 | Graham | 358/148 |
| 2,580,673 | 1/1952 | Graham | 358/148 X |
| 3,180,929 | 4/1965 | Hibbard et al. | 360/37 |
| 3,335,218 | 8/1967 | Johnson | 358/127 X |
| 3,371,154 | 2/1968 | Frochbach et al. | 358/145 X |
| 3,573,358 | 4/1971 | Markevitch | 358/127 |
| 3,644,677 | 2/1972 | Cecchin et al. | 358/12 X |
| 3,723,637 | 3/1973 | Fujio et al. | 358/145 X |
| 3,893,163 | 7/1975 | Wessels et al. | 358/128.5 |
| 3,931,457 | 1/1976 | Mes | 358/128.6 |
| 3,977,021 | 8/1976 | Kobayashi et al. | 358/128.6 X |
| 4,012,771 | 3/1977 | Ishigaki et al. | 358/4 |
| 4,068,259 | 1/1978 | Tinet et al. | 358/13 |
| 4,104,683 | 8/1978 | Granger | 360/37 X |
| 4,152,727 | 5/1979 | Tatsuguchi et al. | 360/77 X |
| 4,159,480 | 6/1979 | Tachi | 360/37 X |

OTHER PUBLICATIONS

Journal of the SMOTE, Jul. 1974, vol. 83; A Review of the MCA Disco-Vision System: Broadbent.

Primary Examiner—Stuart N. Hecker
Attorney, Agent, or Firm—Cushman, Darby & Cushman

[57] ABSTRACT

In a system for broadcasting audio-visual television signals, a pure-frequency pilot signal is recorded concurrently with the video signals. The synchronizing signals which are necessary for reproduction of the aduio-visual signals are reconstituted from the pilot signal during the reading process.

9 Claims, 7 Drawing Figures

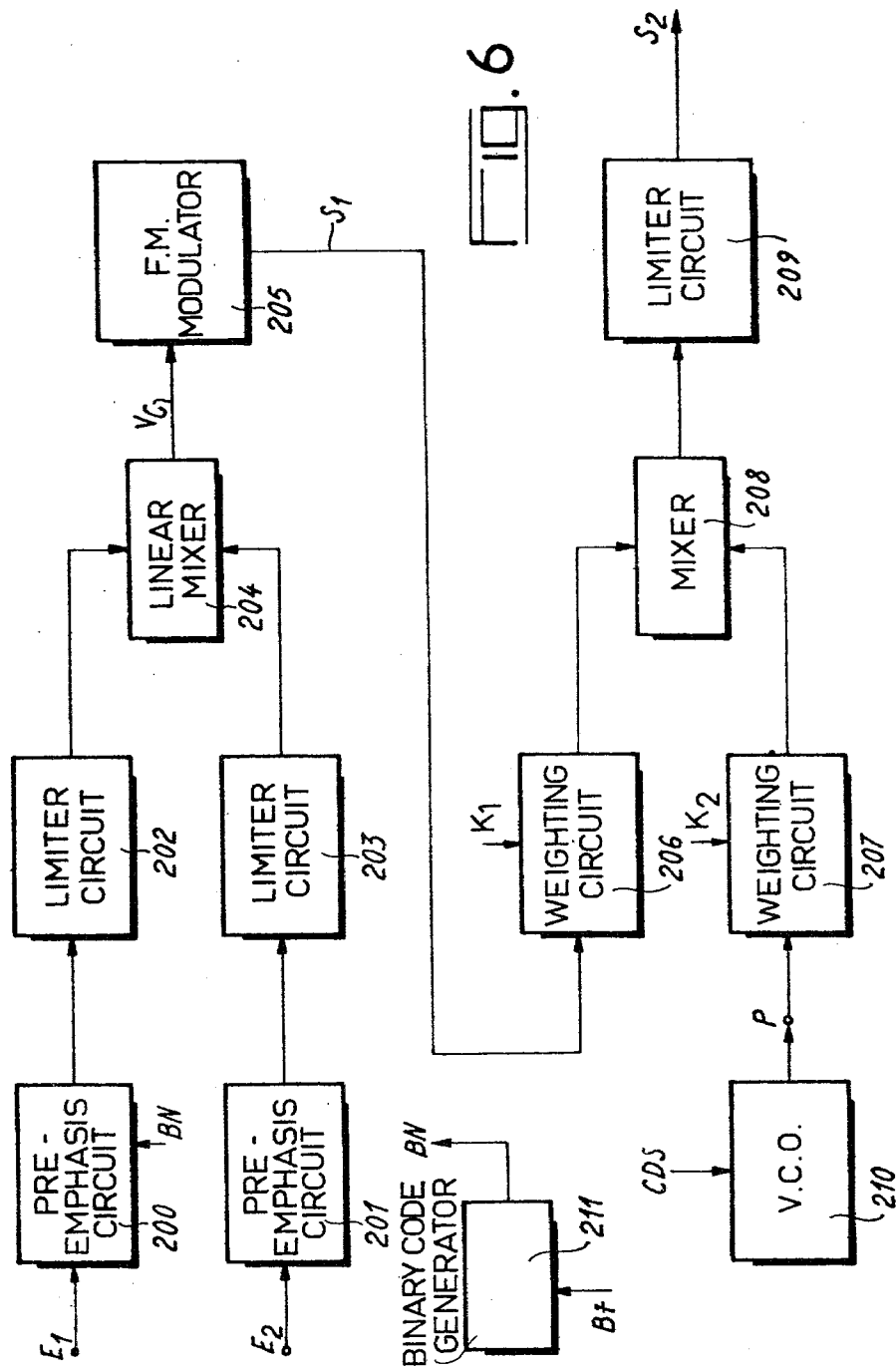

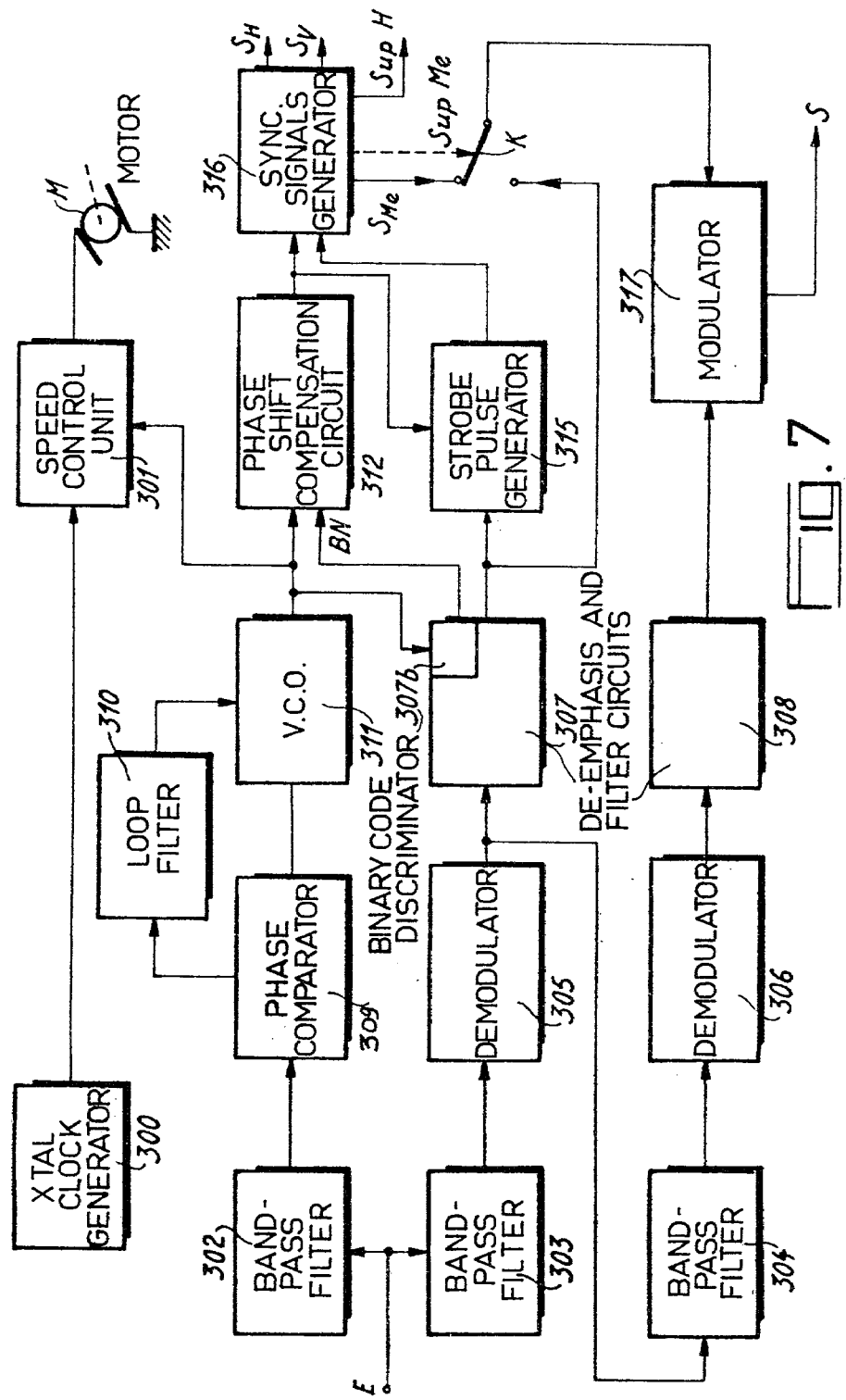

SYSTEM FOR BROADCASTING AUDIO-VISUAL TELEVISION SIGNALS SYNCHRONIZED BY A PILOT FREQUENCY AND METHOD FOR THE APPLICATION OF SAID SYSTEM

This invention relates to systems for broadcasting audio-visual television signals and in particular to a broadcasting system comprising recording media for color television signals, such as optical or magnetic reading disks or tapes.

It is a well known practice to record on media of this type television signals which usually have a video component and a sound component. In a color television broadcast, a color video signal consists of a luminance signal and a chrominance signal. These different components are subsequently combined and modulate a carrier wave, for example by varying the frequency. In accordance with one advantageous method, the carrier wave can in turn be coded in a train of width-modulated pulses. These pulses are then recorded on a medium by any suitable means. Other methods can also be contemplated but, when reading signals which have thus been recorded, it is necessary in all cases to have line and field synchronizing signals in order to permit reproduction of the picture signals on a screen.

A customary practice in the prior art is to multiplex standardized synchronizing pulse signals with the luminance video signal. In a first step, this multiplexing operation usually takes place in amplitude during line and field-scanning retrace intervals and the composite signal thus obtained serves to carry out frequency-modulation, for example, of a carrier wave after combination with the chrominance video signal to be frequency-modulated, for example, in accordance with the method explained in the foregoing. In the particular case of black and white television, the chrominance video signal is absent.

Although in universal use, this method is attended by disadvantages. In the first place, the entire available amplitude for modulation of the video signal cannot be employed since it is necessary to reserve a portion of this amplitude (30% in the French television standard) for multiplexing synchronizing signals. Since this synchronization takes place on the synchronizing pulse signal transitions, any degradations of the edges of these signals or any superimposition of spurious signals are liable to give rise to faulty synchronization. Loss of the image code at the time of reading also results in image bouncing or jitter at the time of reproduction. Although the list of drawbacks mentioned above is not an exhaustive one, it may finally be noted that the line retrace or field blanking intervals occupied by synchronizing signals cannot be completely utilized for other purposes.

In order to overcome these disadvantages, the invention provides a pure-frequency pilot signal instead of the usual synchronizing signals. This method does not call for any costly additional means. A pure-frequency signal can in fact be readily produced and combined by adding to the carrier frequency but existing signals can also be employed in some instances. During the reading process, a simple filtering operations makes it possible to separate the pilot signal from the usual television signals. The pilot signal is then utilized for the purpose of reconstituting the usual synchronizing signals and if necessary for controlling other electronic and/or electromechanical time bases. In particular, a regenerated pilot signal can be employed for regulating the transfer rate or speed of traversal of the recording medium. Finally, the line and image retrace intervals which are left free can be employed for recording digital or analog information and interlaced with the video signals.

The invention is therefore directed to a system for broadcasting audio-visual television signals which utilize a multiplex wave composed of a train of width-modulated pulses which can be transcribed on a track carried by an information medium, the audio-visual signals being such as to comprise a video signal. The broadcasting system comprises a first frequency-modulation circuit for producing a carrier wave modulated by the video signal, a second circuit for combining the carrier wave thus modulated with an additional pure-frequency signal and a third circuit for width-modulation and amplitude-limiting of the composite signal thus obtained. In the broadcasting system, the additional pure-frequency signal is employed during the reading process and after separation by filtering for the purpose of reconstituting the synchronizing signals which are necessary for subsequent reproduction of the audio-visual signals.

The invention is further directed to a method for coding and decoding of a television signal which is synchronized by pilot frequency.

Further advantages will become apparent from the following description of a preferred embodiment of a system in accordance with the invention for broadcasting audio-visual signals.

A more complete understanding of the invention will in any case be gained from this description and from the accompanying drawings, wherein:

FIG. 6 shows a coder in accordance with the invention for coded color television signals;

FIG. 7 shows a decoder in accordance with the invention for coded color television signals.

In the specification which now follows, the processing of signals other than the pure-frequency pilot signal which alone comes within the scope of the invention will be explained in detail only if it is thus possible to gain a clearer understanding of the invention. In particular, no mention will be made of the means for transcribing on the recording medium (of the video disk type in the preferred embodiment of the invention). Similarly, no reference will be made in the following description to the processing of the sound component of the television signals. All these techniques have been fully delt with in the prior art.

Figure 1:
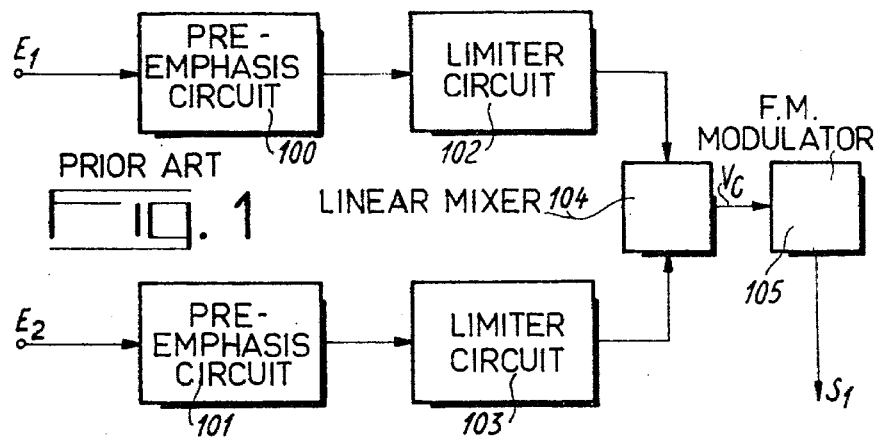
FIG. 1 shows a color television coder of the prior art.

However, it is useful to recall a few basic principles relating to the signals referred-to in the foregoing. In a color television signal coder in accordance with the prior art as shown in FIG. 1, two signals (in addition to the sound signal which is not shown) are to be transmitted:

the luminance signal E'y which is obtained by matrixing of the three primary colors ($E'_V$, $E'_R$, $E'_B$) such that $E'y = 0.59 E'_G + 0.30 E'_R + 0.11 E'_B$ The method adopted for processing the signals in order to obtain E'y is known to anyone versed in the art.

This signal is transmitted with synchronizing signals as will be described hereinafter.

The chrominance signal which is close to the chrominance signal of the French television standard in the SECAM color system and comprises the signals:
$D'_R = E'_R - E'_y$ and $D'_B = E'_B - E'_y$
which are transmitted sequentially from line to line.

The luminance and chrominance signals are modulated and multiplexed in the manner described below. The values of frequencies are given by way of example and not in any limiting sense with reference not only to FIG. 1 but also to the other figures described hereinafter.

Figure 2:
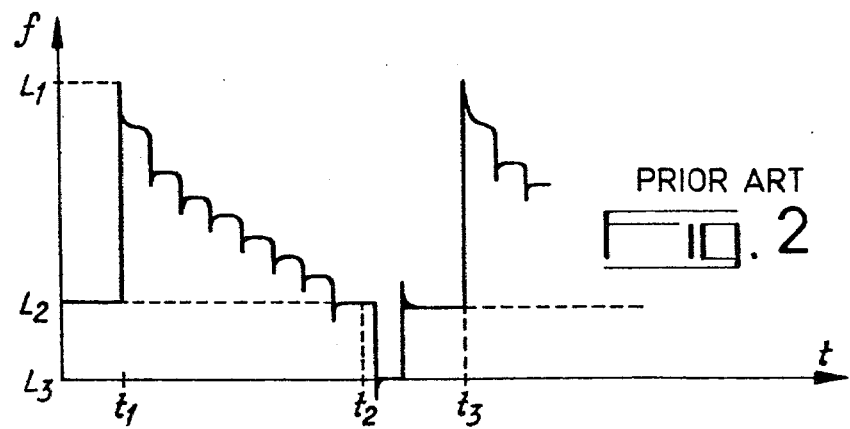
FIG. 2 is an example of a coded video luminance signal in accordance with the prior art.

The luminance signal ($E'_y$) is transmitted on a frequency-modulated carrier frequency. This signal which is generated in known manner is then pre-emphasized in accordance with a law which is substantially the same as the one applied to the majority of professional magnetoscopes. This law is of no interest in the present invention and is not reproduced in this specification. The pre-emphasized signal $E'_y$ is shown in FIG. 2 (in the case of a 75% color bar pattern). It is worthy of note that the useful frequency-variation amplitude representing the luminance signal is illustrated by the single segment $L_1-L_2$ of the axis F. The luminance signal is present during the time interval $t_1-t_2$; the interval $t_2-t_3$ represents the time required for a line retrace. During this interval, there are inserted the line synchronizing signals which call for a frequency sweep: segment $L_2-L_3$. Similarly, the field synchronizing signals are inserted during the field blanking intervals (not shown).

The aforementioned pre-emphasized signal $E'_y$ frequency-modulates a sine-wave carrier. The frequency swing is 1.5 MHz in the case of the signal having maximum amplitude to which there must be added the additional swing caused by the pre-emphasis peaks. The maximum swing: signal+pre-emphasis peaks is limited to 3 MHz peak-to-peak by clipping the heighest peaks.

It has been noted earlier that the chrominance signal is close to that of the SECAM standard; this signal accordingly appears in the form:
$D'_R$ during the lines n, n+2, n+4 . . .
$D'_B$ during the lines n+1, n+3, n+5 . . .
This signal has been subjected to the pre-emphasis law in accordance with the SECAM process and is caused to frequency-modulate a sine-wave having a mid-band frequency of 3.6 MHz and a maximum deviation of ±400 KHz.

This frequency-modulated wave is then added to the luminance signal $E'_y$ in order to modulate with this latter the principal carrier oscillator noted earlier. This wave is then limited or clipped and the resultant signals are width-modulated in accordance with a known process.

FIG. 1 describes a general arrangement of the coder which performs the functions explained in the foregoing. The luminance signal comprising the line and field synchronizing pulses is transmitted to the input $E_1$ of a pre-emphasis circuit 100. The signals thus processed are then limited by the circuit 102. Similarly, the sequential chrominance signals transmitted to the input $E_2$ are pre-emphasized at 101 and limited at 103 in order to be mixed with the luminance signals in the circuit 104. The circuit 105 represents a frequency modulator. The principal carrier frequency which is frequency-modulated by the composite video signal Vc will be available at the output S1.

Figure 3:
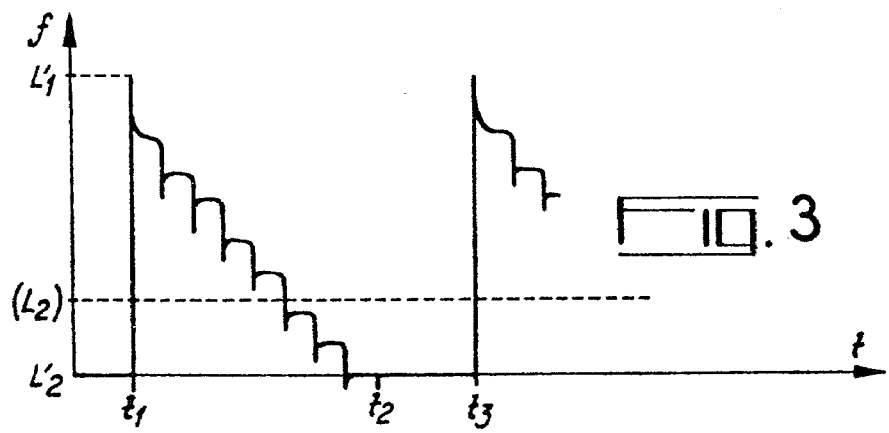
FIG. 3 shows the same coded signal according to one aspect of the invention.

FIG. 6 shows a color television signal coder in accordance with the invention. The chain of circuits 200 to 205 is identical with the chain of circuits shown in FIG. 1. Only the luminance signal which is present at the input $E_1$ is different in accordance with one of the aspects of the invention. In fact, this signal does not comprise any standard synchronizing signals. FIG. 3 illustrates a signal of this type. In comparison with FIG. 2 in which the frequency and time scales are identical, FIG. 3 shows that the available dynamic range of modulation available for the luminance signal alone is put to more effective use.

According to another apsect of the invention, the synchronizing signals are reconstituted by employing a pilot signal during the reading process. The pilot signal must therefore be recorded concurrently with the video signals. A signal of this type is generated by any suitable means such as a phase-locked oscillator or so-called voltage control oscillator (V.C.O.) designated by the reference 210 and is present on the input P. The frequency of said signal must be an exact multiple of the line-scanning half-frequency. To this end, this frequency makes use of control signals CDS derived from a line scanning generator (not shown in the drawings).

Since the synchronization is not transmitted in its usual form with the luminance signal $E'_y$, it is necessary in addition to said pilot signal to transmit a code which will make it possible at the time of reading to distinguish the beginning of each transmitted television picture. This is obtained by adding to the signal $E'_y$ a single train of coded pulses BN during one of the field blanking intervals (vertical-scanning return stroke) of each image. This signal appears in the form of a binary train of n bits (24 in the particular example of construction herein described). This train is modulated in accordance with the so-called "non-return to zero" (NRZ) technique and is demodulated at the time of reading by using the pilot as a clock signal. The pulse train is produced by the module 211 in synchronism with field blanking signals Bt derived from a sweep generator (not shown). In spite of the presence of this code, practically the entire field blanking interval and the line retrace intervals are freed from all synchronizing signals. They can be employed for transmitting digital or analog information and are time-multiplexed with the video signals. In particular, the sound component can thus be recorded, for example in the form of digital samples. In this case it serves no useful purpose to generate a sound carrier. Other codes can be transmitted in this manner: image number, slow-variation visual signals, and so forth. This constitutes another advantageous aspect of the invention.

It has been noted in the foregoing paragraphs that the pilot signal is formed of a pure sine-wave; the frequency of this signal is 144 FL, where FL represents the line frequency namely 2.25 MHz in the case of a 625-line standard with 25 images per second (again in the example mentioned).

This wave is added to the main carrier which is present at S1 so that this latter is delivered by the modulator in accordance with a law:

$$K_1 \cdot A_{pAL} + K_2 AP \text{ with } \begin{cases} A_{pAL}: \text{amplitude of the principal carrier} \\ A_p: \text{amplitude of the pilot signal} \end{cases}$$

Figure 4:
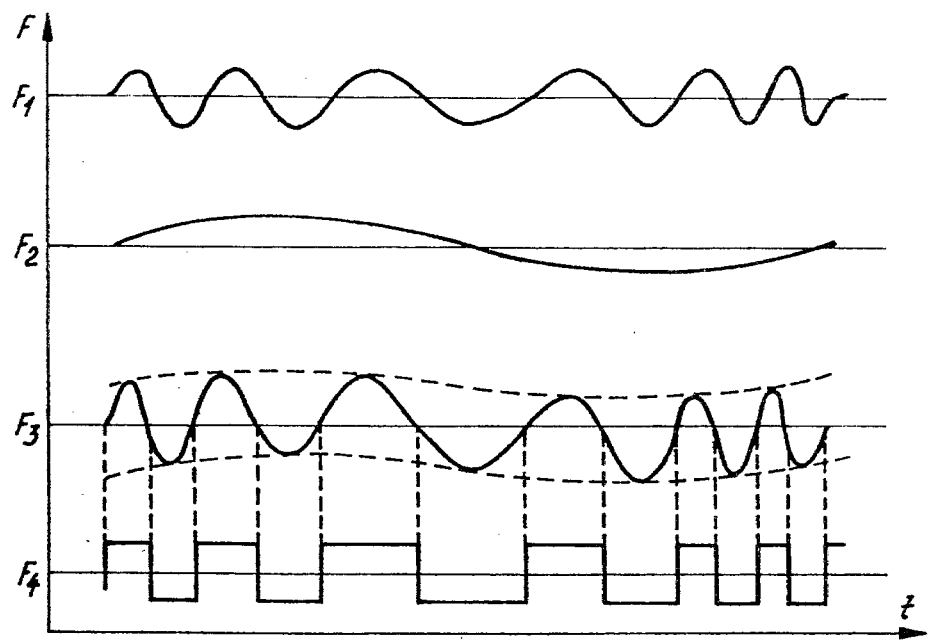
FIG. 4 is an explanatory diagram of the technique adopted for modulation and sampling.

The coefficients $K_1=0.8$ and $K_2=0.2$ can be adapted to the recording and reading conditions in such a manner as to obtain the most effective compromise between signal/carrier noise, signal/pilot noise and intermodulation. These operations are performed by the circuits 206 and 207. After mixing at 208, the resultant signal is limited at 209 so as to form a train of pulses having variable widths representing the zero crossings of the resultant signal. The steps of these operations are summarized on the time diagram of FIG. 4. The line F1 represents the principal frequency-modulated carrier wave which is available at the output S1. The line F2 represents the fixed-frequency pilot signal, the line F3 represents the combination of the two signals just mentioned after weighting in accordance with the law stated in the foregoing and the line F4 represents the signal at the output S2 of the coder in accordance with the invention.

Figure 5:
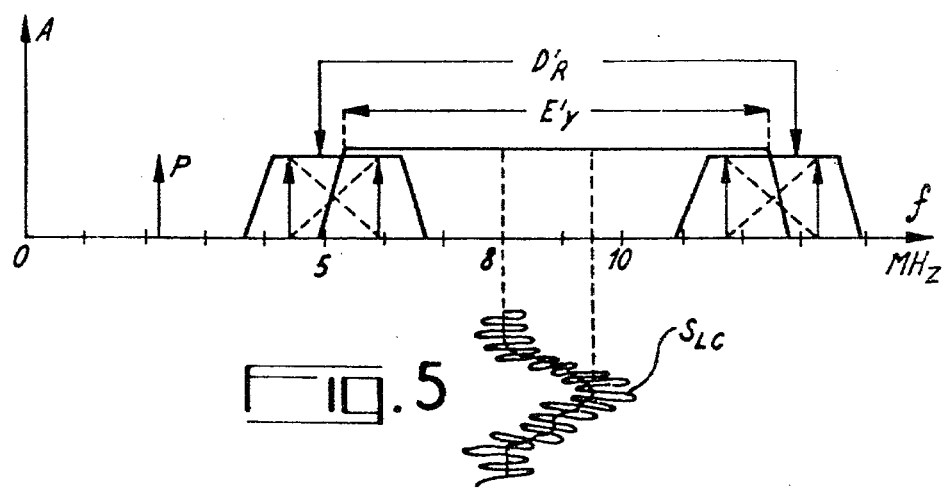
FIG. 5 shows an arrangement of the frequencies of the coded and recorded signal.

The frequency spectrum occupied by a modulation system of this type is shown in FIG. 5. Solely by way of indication, the pre-emphasized video luminance signal produces frequency modulation of a sine-wave carrier, the instantaneous frequencies of which have a value of 8 MHz in the case of the black level and 9.5 MHz in the case of the maximum white level. The maximum frequency swing including the pre-emphasis peaks has a peak-to-peak value of 3 MHz as mentioned earlier. The video chrominance signal remains unchanged with respect to the prior art. The pilot frequency is indicated in FIG. 5 by the letter P. The composite "luminance + chrominance" signal is designated by the reference $S_{LC}$.

This method of modulation is known and described in U.S. Pat. No. 4,068,259 granted in the name of the present Applicant.

The teachings of U.S. Pat. No. 4,068,259 are incorporated herein by reference.

Recording and reading operations performed on and from a moving medium of the video disk type will not be described since the method according to the invention remains compatible with known techniques of the prior art.

FIG. 7 describes a coded color television signal decoder in accordance with the method of the invention. The HF signal which is produced by the reading elements (not shown) and the spectrum of which is shown in FIG. 5 is transmitted via the input E on the one hand to a 3 to 14 MHz band-pass filter 303 which passes the spectrum of the luminance and chrominance signals around the principal carrier wave and, on the other hand, to a band-pass filter 302 which is centered on the frequency 2.25 MHz±200 KHz and passes the pilot signal. The y-channel and chrominance demodulating circuits, the NTSC, PAL or SECAM modulators which form part of the prior art will not be described.

The following description will be concerned only with processing on the pilot signal and reconstitution of synchronizing signals which provide the invention with its original character.

After filtering through the band-pass filter 302, the pilot signal derived from the reading unit is regenerated within a conventional phase-locked loop composed of a voltage control oscillator (V.C.O.) designated by the reference 311, a phase comparator 309 and a loop filter 310. The frequency of the oscillator 311 is locked to the pilot signal frequency. The time constant of the loop is calculated so as to ensure that reading errors arising from losses of the pilot signal of short duration (less than 2 television lines) do not have any disturbing effect on the synchronizing signal. However, this time constant must not be of excessive length in order not to mask rapid variations in speed of traversal of the recording medium since such variations must be corrected subsequently by the speed control circuit 301, this circuit being controlled by the output of the oscillator 311 which is locked to the pilot signal. In practice, this time constant is fixed at approximately ten lines.

The frequency of the pilot signal and therefore of the oscillator 311 is 144 FL (FL being the line frequency) in the exemplified embodiment under consideration. It is only necessary in the synchronizing generator 316 to divide this frequency by 144 in order to determine the line frequency and then by 50 or 60, as the case may be, in order to determine the field frequency (outputs SH and SV).

At the output of the oscillator 311, the regenerated pilot frequency is transmitted to a circuit 312 which is intended to compensate for the difference in propagation time between the channel which transmits the luminance signals $E'_y$ and the channel which transmits said pilot frequency. Re-phasing of the signals is carried out in such a manner as to ensure that each rising transition of the regenerated pilot signal corresponds to the center of one bit of the image-beginning binary train BN which is transmitted with the video luminance signal. Thus the regenerated pilot signal can be employed as a clock signal in the image-synchronizing demodulator 315 in order to demodulate the binary train. There is thus available at the output of the demodulator 315 a pulse which is intended to re-phase the synchronizing generator 316 with the video signal, this re-phasing operation being carried out by resetting the synchronizing generator to zero at the beginning of each image (beginning of line No. 1). It should be noted that, although it is performed at each image, this resetting operation is necessary only once at the beginning of the reading operation. The synchronizing generator 316 controlled by the regenerated pilot signal can subsequently no longer be shifted as long as the reading operation is not interrupted during a period exceeding the duration of two to three lines. This is a considerable advantage since the system will be insensitive to any absence of zero-resetting resulting from reading errors on the binary train. This particular feature constitutes one of the most important characteristics of the invention.

Another important characteristic is as follows: the synchronizing signal which is thus reconstituted in the synchronizing generator 316 is free from any background noise, erroneous signal or impaired transition of pulse signals; this would not be the case if said synchronizing signal had been transmitted with the luminance signal in the conventional manner. This results in much more efficient operation of monitors or other units which are intended to utilize this signal.

The pilot signal can also be utilized for controlling the speed of traversal of the recording medium. This constitutes another advantageous aspect of the invention. In the case of a video disk, the circumferential speed of traversal of the recorded track with respect to the optical reading head must be controlled. This control operation is carried out by means of a loop connected unit 301 which receives on the one hand the clock frequency derived from a quartz oscillator 300 and on the other hand the regenerated pilot signal. The comparison made between the clock phase which is the reference and the phase of the regenerated pilot signal which depends on the speed of traversal of the track produces an error signal which is first amplified and then corrects the speed of rotation of the disk drive motor M.

By virtue of the absence of erroneous signals and of the much higher comparison frquency, the system which is described above and utilizes the regenerated pilot signal makes it possible to obtain a much higher gain of the speed-control servomechanism than in the case of the conventional system which utilizes the synchronizing signal transmitted on the luminance. By way of example, in an experimental system produced in accordance with the invention, the gain of the servomechanism has increased from 20 decibels in the case of the conventional system to 34 decibels in the case of the system herein described, at a frequency of 25 Hz.

A particular case to be considered is that of a rapid displacement of the reading head (image finding, rapid access to a required number). Experience has shown that the HF signal bursts read on each track which is traversed are sufficient to maintain in the locked condition the regenerated pilot signal loop and consequently the synchronizing signal as well as the track traversal speed control. The method according to the invention permits correct operation without any need to adopt special measures.

Utilization of the pilot signal is not limited to the basic aspects of the invention described in the foregoing. It has been noted that the regenerated pilot signal constituted a reliable clock signal whose phase was closely related to that of the other signals recorded on the medium.

By virtue of this property, said pilot signal can be employed for demodulating other signals. For example in the case of demodulation of a chrominance signal which would be recorded either in amplitude modulation with suppressed carrier and line-by-line sequential chrominance signals or in suppressed-carrier modulation of the PAL or NTSC type, conventional demodulation by means of bursts being impossible in this case by reason of the rapid residual variations of the speed of traversal.

Another example would be the demodulation of additional binary trains disposed within the line and field blanking intervals of the luminance signal which are entirely released by the absence of conventional-synchronization signals. This would be the case for example in one or a number of numerical sound tracks, image numbers or other codes containing various types of information (texts, loading or reader management microprocessor memories and so forth) as mentioned earlier. The bit rate is equal to double the frequency of the pilot signal, namely 4.5 Mbits/sec in the example chosen.

The pilot can also be employed for the operation of an electromechanical or electronic time base corrector. In fact, since the pilot frequency at the time of reading fluctuates at the sme rate as the variations in velocity of the recording medium, these fluctuations can be detected and consequently corrected by comparing the pilot with a stable oscillator having the same frequency.

Finally, the pilot can also be employed as a clock signal in order to store the read information being then delivered by the memory through the stable oscillator.

It should be observed, however, that a few elementary precautions must be taken in regard to the choice of the pilot frequency.

It is known that, in any recording system, imperfections of writing, reading or the like will cause the appearance of intermodulation terms. In particular, the frequency of the pilot signal can appear in the band occupied by the demoudulated luminance signal. By reason of its synchronisum with the image, said frequency will appear as vertical bars on the image. Although they have a very low level, these bars may be visible and even troublesome when reading takes place under poor conditions. In order to avoid this inconvenience, it is therefore advisable to interlace said bars. This can be achieved in two ways:

Line-frequency interlacing: this is the solution which provides the most effective protection. The frequency of the pilot signal must be an odd multiple of the line half-frequency, with the result that the pilot signal and therefore the spurious intermodulation signal as well will be presented in phase opposition from one line to the next, thus preventing the formation of bars on the screen.

Field-frequency interlacing: the phase of the pilot signal is reversed at each field, thus producing the same visual effect as before; it appears, however, that the protection is slightly less effective in the case of high intermodulation values. On the other hand, this arrangement does make it possible to protect the image commencement code or in other words, in the case under consideration, the train of 24 binary-coded bits in the highly improbable but none the less existing cases in which said code may be contained in a video signal of the image.

In order to carry this protection into effect, the phase reversal of the pilot signal must take place immediately at the beginning of the binary train which constitutes the image commencement code. Detection of the phase reversal of the pilot signal by simple means at the time of reading by comparing, for example, the phase of the regenerated pilot signal at the output of the oscillator 311 with the phase of the pilot signal derived from the reading operation makes it possible to open a gate solely during the time required for passage of the pulse which resets the synchronizing generator and which is delivered by the image synchronization demodulator 315.

The synchronizing generator 316 delivers the following signals:
line synchronization: SH - line blanking: Sup H
field synchronization: SV - mixed blanking: Sup Me
mixed synchronization: SMe.

The luminance signal delivered by the demodulation chain after filtering appears in the form described in FIG. 2, namely without synchronizing signals.

In order to permit utilization of the signal in the majority of monitors, it is necessary to add thereto the mixed synchronizing signal delivered by the synchronizing generator 316. This operation is performed by means of the electronic switch K controlled by the mixed blanking signal: Sup Me. The switch passes only the luminance signal during the visible scanning periods and passes only the synchronizing signal during the invisible periods (blanking H and V) corresponding to the line and field scanning retrace intervals. The respective levels of the luminance and synchronizing signals will have been previously adjusted in a suitable manner.

After mixing of these signals, the video signal thus formed can drive a modulator 317 together with the chrominance signal derived from the chrominance demodulator 306. Depending on circumstances, the modulator 317 will be of the SECAM, PAL or NTSC type or any other known type.

In order to gain a more complete understanding of FIG. 7, it can briefly be mentioned that the module 305 is a luminance demodulator and that the module 304 is a band-pass filter which is centered around 3.6 MHz and drives a chrominance demodulator 306. So far as the two modules 307 and 308 are concerned, these latter are de-emphasis and filtering units, respectively for the luminance and chrominance video signals. All these functions are common with the prior art.

The module 307 further contains a discriminator 307b for isolating the train of 24 binary-coded bits. To this end, the pilot signal is employed as a clock signal.

The invention is not limited to the embodiment described in the foregoing. It is also possible to employ all or part of this coding system for recording television signals on media other than the video disk (magnetic tapes, for example) or for any other purpose without thereby departing either from the scope or the spirit of the invention.

It should be mentioned in particular that a coded recording as contemplated in the method according to the invention can remain compatible for reading with a broadcasting system of the prior art. In order to achieve this objective, certain advantages of the invention have to be waived since the standard synchronizing signals must be maintained in the recording in addition to the pilot signal. As a consequence, the sound component can no longer be recorded within the line retrace and field blanking intervals. It is further apparent that, apart from the compatibility which is maintained, coding in accordance with the method of the invention does not provide any improvement when the recording is read by a decoder of the prior art; only the use of the pilot signal which constitutes the basic concept of the invention permits the improvements mentioned earlier. However, this possibility may appear to be advantageous in certain commerical applications.

What is claimed is:

1. A system for broadcasting audio-visual signals representing television pictures defined by fields, each field divided into scanning lines, said audio-visual signals including a video signal component, comprising:
   a recording section including a first frequency-modulation circuit for producing a carrier wave modulated by said video signal,
   a second circuit for producing a continuous sine wave pilot signal having a frequency that is a multiple of the line scanning half frequency of the pictures,
   a third circuit for combining said carrier wave, as modulated by said video signal with said continuous sine wave pilot signal for producing a composite signal,
   a fourth circuit for width-modulating and amplitude-limiting said composite signal,
   an information medium provided with a track for recording said composite signal, and
   a reading section comprising:
      filter circuits for extracting said continuous sine-wave pilot signal from said composite signal and means for generating from said continuous sine wave pilot signal standard synchronizing signals used in conventional television systems.

2. A system according to claim 1, wherein said video signal component is free from any standard synchronizing signals used in conventional systems, said system comprising first means for recording information signals within the intervals normally used in conventional systems for the line-scanning retrace time and second means for recording during an interval normally used in conventional systems for the field-scanning blanking time, said information signals comprising a single train of bits representing an image commencement binary code.

3. A system according to claim 1, wherein said means for generating synchronizing signals comprise a phase-locked loop having a voltage-controlled oscillator (VCO), a phase comparator and a loop filter, said phase-locked loop having a predetermined time constant, and said loop being controlled by said continuous sine-wave pilot signal.

4. A system according to claim 3, wherein said time constant is so determined as to make said VCO insensitive to changes of a substantially short duration in said continuous sine-wave signal.

5. A system according to claim 1 further comprising in said recording section clock signal generators for controlling electronic or electromechanical units, said clock signal generators adapted to be synchronized by said continuous sine-wave pilot signal extracted by said recording section.

6. A system according to claim 1, wherein the reading section comprises means for optical reading of said information medium.

7. A system according to claim 1, wherein the reading section comprises means for magnetic reading of said information medium.

8. A system according to claim 1, wherein said continuous sine wave pilot has a frequency that is an odd multiple of the line half frequency.

9. A method for broadcasting audio visual signals representing television pictures defined by fields, each field being divided into scanning lines, said audio visual signals including a video signal component, comprising the steps of:
   inserting a single train of bits representing an image-commencement synchronizing binary code within an interval corresponding to the blanking of one of said fields constituting an image;
   frequency modulating a principal carrier wave by said video signals;
   generating a continuous sine-wave pilot signal that is an exact multiple of the line-scanning half-frequency;
   weighting the amplitudes of said carrier wave and of said sine-wave pilot signal by predetermined coefficients;
   combining said principal carrier wave with said continuous sine-wave pilot signal to obtain a composite signal;
   width-modulating and amplitude-limiting said composite signal;
   recording said composite signal onto a recording medium;
   reading the composite signal from said recording medium;
   extracting said continuous sine-wave pilot signal from said composite signal read from said recording medium; and generating
   from said continuous sine-wave pilot signal so extracted standard synchronizing signals used in conventional systems.

* * * * *